US005104307A

United States Patent [19]

van den Brink

[11] Patent Number: 5,104,307

[45] Date of Patent: Apr. 14, 1992

[54] INJECTION NOZZLE FOR USE IN AN INJECTION MOULDING DEVICE

[75] Inventor: A. van den Brink, Westmaas, Netherlands

[73] Assignee: Eurotool B.V., 'S-Gravendeel, Netherlands

[21] Appl. No.: 644,953

[22] Filed: Jan. 18, 1991

[30] Foreign Application Priority Data

Jan. 18, 1990 [NL] Netherlands ........................ 9000126

[51] Int. Cl.[5] ........................ B29C 45/23

[52] U.S. Cl. ........................ 425/564; 251/315; 425/566

[58] Field of Search ........................ 251/315; 425/562, 563, 425/564, 565, 566

[56] References Cited

U.S. PATENT DOCUMENTS

| | | | |
|---|---|---|---|
| Re. 28,721 | 2/1976 | Farrell | 425/564 |
| 2,637,073 | 5/1953 | Walther | 264/261 |
| 2,770,842 | 11/1956 | Hahn et al. | 264/328.16 |
| 3,743,465 | 7/1973 | Asner | 425/594 |
| 3,758,248 | 9/1973 | Drazick | 425/145 |
| 4,330,258 | 5/1982 | Gellert | 425/566 |
| 4,832,593 | 5/1989 | Brown | 425/564 |

FOREIGN PATENT DOCUMENTS

| | | |
|---|---|---|
| 2073179 | 9/1971 | France . |
| 1043055 | 9/1966 | United Kingdom . |
| 1211496 | 11/1970 | United Kingdom . |
| 2095161 | 9/1982 | United Kingdom . |

*Primary Examiner*—Tim Heitbrink
*Attorney, Agent, or Firm*—Young & Thompson

[57] ABSTRACT

Injection nozzle for use in a device for moulding an object of a thermoplastic material in an injection mould, comprising a nozzle with a feed channel (4) running through it which connects at the bottom end to a jet passage (7) and at this end has a ball-shaped closing element (9) which can be turned by means of control means (11, 12, 13) from a position in which the inlet aperture of the jet passage extending through the member (9) coincides with the end aperture at the bottom end of the feed channel to a position in which said inlet aperture lies entirely outside the above-mentioned end aperture, so that the end aperture of the feed channel is blocked by the member.

7 Claims, 2 Drawing Sheets

10 6 2 16 II 15 5 4 1 3 13 II 12 8 7 9 11

Fig-1
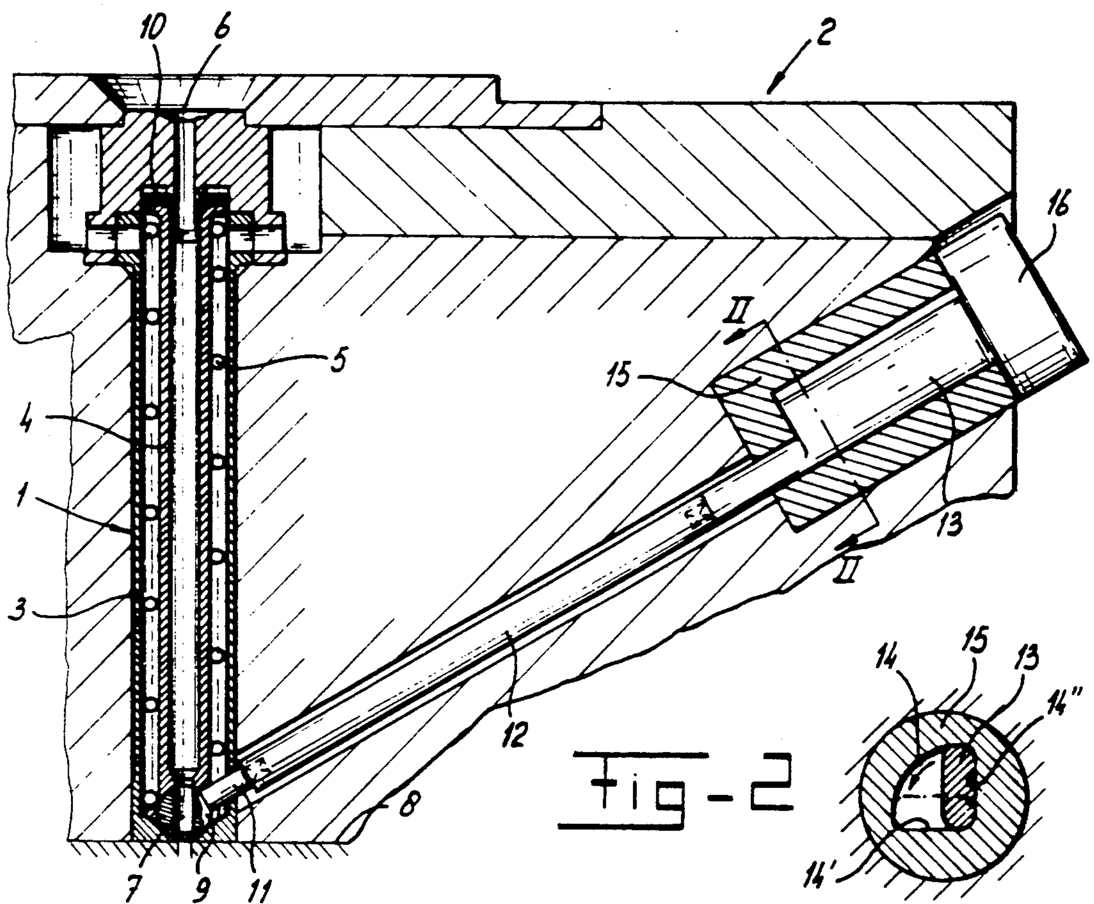
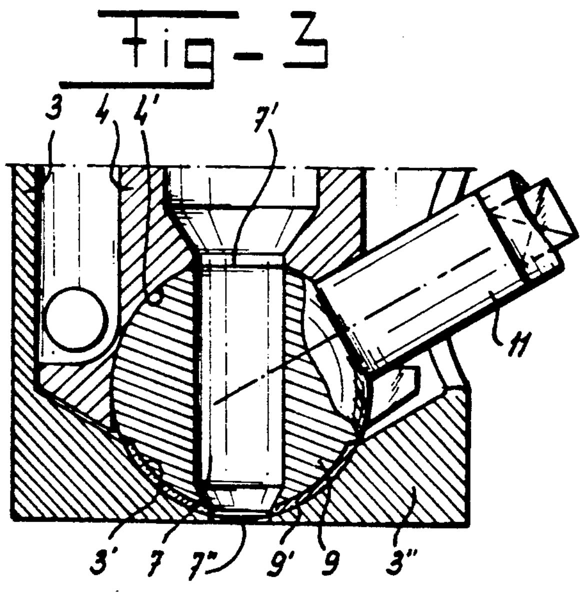
Fig-4
4
11
7'
7"
9
7

INJECTION NOZZLE FOR USE IN AN INJECTION MOULDING DEVICE

BACKGROUND OF THE INVENTION

The invention relates to an injection nozzle for use in a device for moulding an object of a thermoplastic material in an injection mould, comprising a nozzle with at least one feed channel running through it which is connected at one end to a supply of the thermoplastic material, and which connects at the other or bottom end to a jet passage, and at this end has a closing element which is connected to control means for moving said element, so that it can be moved from a position in which the jet passage is in open communication with the feed channel to a position in which said communication is broken. Such a nozzle is known from U.S. Pat. No. 4,330,258.

In the injection moulding of a thermoplastic material the material is injected in a hot, liquid state and under pressure through an injection nozzle into the mould cavity inside an injection mould. In this case, at the jet passage of the nozzle where the material goes into the mould cavity, there has to be an abrupt transition in the temperature from the channel running through the nozzle to the temperature of the mould cavity, in order to ensure that when the finished object is being removed from the mould or unmoulded a clean break is obtained between said object and the material still present in the jet passage. Such an abrupt temperature transition cannot, however, be achieved, since a certain heat transfer will always take place between the nozzle and the mould, due to the fact that in injection moulding very high pressures are applied, as a result of which the mould has to be of a high-grade metal and/or ceramic material.

DESCRIPTION OF THE RELATED ART

For the solution to this problem, in the device according to the above-mentioned publication use is made of a closing element which is formed by the end part of a closing pin which extends through the feed channel and is movable to and fro, which end part can interact with a seat formed at the bottom end of the feed channel, so that after injection moulding of an object the jet passage can be shut off, as a result of which, the material in the feed channel is separated from the material injected into the mould cavity, resulting in a clean break being obtained.

The use of such a to and fro moving closing pin extending through the feed channel has, however, the disadvantage that, due to the fact that the pin remains in the liquid flow through the feed channel during the injection moulding, the flow is broken, which leaves noticeable traces in the plastic product finally obtained. Besides, such a closing pin causes additional flow resistance in the feed channel.

OBJECT OF THE INVENTION

The object of the invention is to provide an injection nozzle of the above-mentioned type which does not have these disadvantages.

SUMMARY OF THE INVENTION

This object is achieved in that in the case of the injection nozzle according to the invention the closing element is formed by a ball-shaped member with a passage running through it which essentially forms the above-mentioned jet passage. The ball-shaped member is fitted so that it rotates about its center point in an annular concave cavity formed at the bottom end of the feed channel and containing a part of the ball. The control means is formed by a stick or similar element fixed to the ball and projecting beyond the nozzle, whose axis intersects the axis of the feed channel. There are provided means for making the stick turn about its axis by which the member can be turned by means of the control means from a position in which the inlet aperture of the jet passage extending through the member coincides with the end aperture at the bottom end of the feed channel to a position in which said inlet aperture lies entirely outside the above-mentioned end aperture, so that the end aperture of the feed channel is blocked by the member.

In an injection nozzle designed in this way, the feed channel is thus free at all times from any part extending through it, so that during the injection moulding the liquid stream flows uninterrupted through the feed channel, while said feed channel only has a flow resistance which is inherent in such a channel.

In order to ensure that when the cooling phase during the thermoplastic material injected into the mould cavity is cooled down the thermoplastic material does not set in the jet passage through the ball, a section of the ball, comprising a part of the surface of the ball, which surrounds the outlet aperture of the jet passage is made of a material which has a lower coefficient of heat conductivity than the material of the remaining part of the ball. In this way, it is ensured that only the insulating part of the ball is in contact with the cold mould, while the remaining good heat-conducting part of the ball is in contact with the warm feed channel, so that the jet passage remains well warmed by the ball.

With such a use of a ball as the closing element, the jet passage through the ball can advantageously form an angle so that it is also possible for injection to take place into a mould cavity in a slanting direction relative to the feed channel. The jet passage through the ball can also split, so that two outlet apertures are present.

Preferably, the nozzle has, in a known manner, two tubular parts, one situated inside the other, the inner part forming the feed channel. According to the invention, the ball is supported here at its bottom side by an inward projecting annular shoulder having an annular concave cavity accommodating the ball in a close fit, the inner part being under spring tension in the direction of the ball by means of a spring element. In this way, any wear of the round surfaces in contact with each other is compensated for automatically.

BRIEF DESCRIPTION OF THE DRAWINGS

The invention is explained in greater detail with reference to the drawings, in which:

FIG. 1 shows an embodiment of an injection nozzle according to the invention, in cross-section;

FIG. 2 shows a cross-section along the line II—II in FIG. 1;

FIG. 3 shows on a larger scale the bottom end with the closing ball of the nozzle according to FIG. 1;

FIG. 4 shows the closing ball according to FIG. 3 in the closed position; and

DESCRIPTION OF THE PREFERRED EMBODIMENTS

Figure 5:
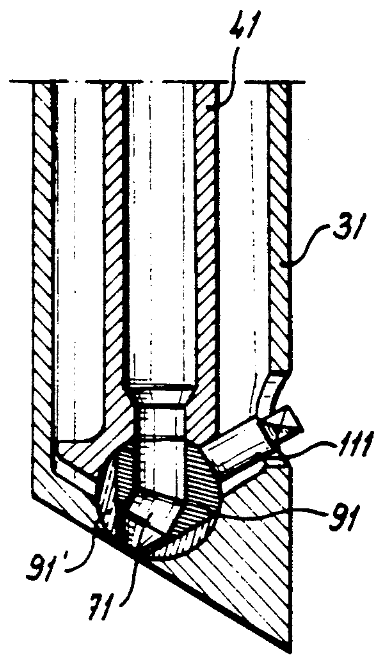
FIGS. 5, 6 and 7 show other embodiments of the closing ball.

As shown in FIG. 1, the injection nozzle 1 is accommodated in an injection mould indicated in its entirety by reference number 2. The injection nozzle 1 comprises an outer tubular part 3 and an inner tubular part 4 lying coaxially therein, inside which an electric heating element 5 is fitted in the space between the parts 3 and 4. The inner tubular part 4 forms a feed channel for the liquid thermoplastic material which can be introduced through the inlet 6 into the feed channel, and which leaves the channel through the jet passage 7 to be injected into the mould cavity (not shown) in the bottom part 8.

The jet passage 7 extends through a ball-shaped closing element 9 which is provided rotatably about its center point between two annular concave cavities, one concave cavity 3' being formed in an inwardly projecting shoulder 3" at the bottom end of the outer tubular part 3, and the other annular concave cavity 4' being formed at the bottom end of the feed channel. The feed channel is in this case movable in the axial direction and is pressed by means of the springs 10 in the direction of the ball-shaped closing element 9, so that the ball-shaped closing element 9, despite any wear which might occur, is always kept in good sealing contact with the concave cavities 3' and 4'. The ball-shaped closing element 9 has a section 9' which is made of a material having a lower coefficient of heat conductivity than the material of the remainder of the element 9. As shown in FIG. 3, this part 9' is in the form of a layer in the form of a segment of a sphere surrounding the outlet aperture 7" of the jet passage 7. However, as shown in FIG. 5, this part 9' can also have a different shape. In this way, it is ensured that the ball-shaped element 9 is in contact with the cold mould 8 only with its insulating part 9', while the other good heat-conducting part of the ball-shaped element 9 is in contact with the warm feed channel, so that the jet passage 7 remains well heated during the cooling phase, and therefore the material cannot set in the jet nozzle.

The ball-shaped closing element 9 is connected to a control stick 11 which is conveyed outwards through the tubular parts 3 and 4 and is coupled there to an extension rod 12 which at the free end is connected to a wing-shaped element 13 which can be turned in a cavity 14 inside a bush 15 by means of the control head 16, the cavity 14 being bounded by two walls 14' and 14" forming a right angle with each other, so that the rod 12 and thereby the stick 11 and the ball-shaped closing element 9 can be turned through an angle of 90° from a first position to a second position and vice versa. FIG. 3 shows the first position of the ball-shaped closing element 9, in which the inlet aperture 7' of the jet passage 7 coincides with the bottom end of the feed channel, so that in this position thermoplastic material can be injected through the feed channel and the jet passage 7 into the mould cavity. FIG. 2 shows the second position, in which the ball-shaped closing element 9 is rotated relative to the position shown in FIG. 3 through 90° about the axis of the stick 11, so that in this second position the inlet aperture 7' of the jet passage 7 lies entirely outside the end aperture of the feed channel, so that said end aperture is blocked by the element 9.

Instead of being formed in a shoulder of tubular part 3 the concave cavity 3' can also be formed inside the injection mould in which case the ball-shaped closing element and the stick 11 and extenstion rod 12 form an integral part permanently located inside the mould.

Instead of the mechanical control of the closing element 9 shown in FIG. 1, this element can also be operated electrically.

In the embodiment shown in FIG. 5 the ball-shaped closing element 91 has a jet passage 71 extending through it and forming an angle, so that it is possible to inject into a mould cavity in a slanting direction relative to the axis of the feed channel 41.

It is also shown in this embodiment that the parts 91' of the convex closing element 91 which are made of an insulating material can also be in the form of two segments of a sphere. The bottom end of the outer tubular part 31 is adapted to this different shape of the jet passage 71. The convex closing element 91 can again be rotated through 90° by means of the stick 111, in the manner shown in FIG. 1, for blocking of the feed channel 41.

Figure 7:
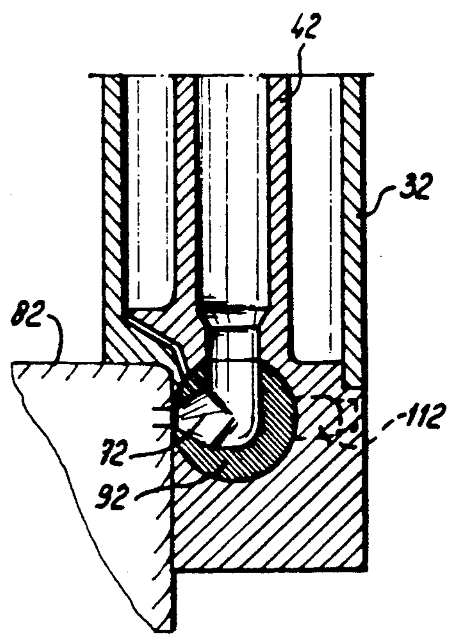

In the embodiment shown in FIG. 7 the jet passage 72 through the ball-shaped closing element 92 essentially forms an angle of 90°. The remaining parts shown in FIG. 7 which correspond to parts shown in FIG. 1 are provided with the same reference numbers, but with the number 2 added after them.

Figure 6:
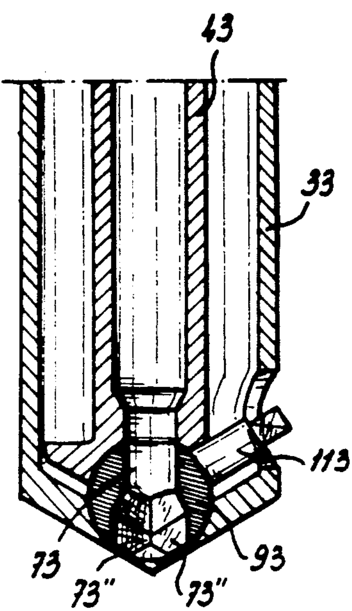

FIG. 6 shows a ball-shaped closing element 93 which is provided with a jet passage 73 which divides inside the element 93, so that two outlet apertures 73" are formed. The remaining parts shown in FIG. 6 which correspond to parts shown in FIG. 1 are provided with the same reference numbers, but with the number 3 added after them.

The ball-shaped closing element 9, 91, 92, 93 shown in the figures can be heated if necessary by fitting a heating element in the stick 11, 111, 112, 113.

I claim:

1. Injection nozzle for use in a device for moulding an object of a thermoplastic material in an injection mould, said injection nozzle comprising a tubular body with at least one feed channel running therethrough, one end of said at least one feed channel being connectable to a supply of a thermoplastic material and an opposite end of said at least one feed channel having a ball-shaped closing member, said ball-shaped closing member having a jet passage running therethrough, said ball-shaped closing member being connected to control means for moving said member between a position in which the jet passage is in open communication with the at least one feed channel, and a position in which said communication is blocked, said ball-shaped closing member being accommodated in an annular cavity formed at the opposite end of the at least one feed channel so that said ball-shaped closing member is rotatable about a center point thereof, said control means comprising a rod fixed to the ball-shaped closing member and projecting beyond the nozzle, said rod having a longitudinal axis, means for turning the rod about the longitudinal axis so that the ball-shaped closing member is movable between said open communication position and said blocked communication position.

2. Injection nozzle according to claim 1, wherein a section of the ball-shaped closing member is made of a material which has a lower coefficient of heat conductivity than the material of the remaining part of the ball-shaped closing member.

3. Injection nozzle according to claim 1, wherein the jet passage through the ball-shaped closing member is non-linear.

4. Injection nozzle according to claim 1, wherein the jet passage through the ball-shaped closing member is divided, so that two outlet apertures are present.

5. Injection nozzle according to claim 1, wherein the tubular body comprises an inner tubular part and an outer tubular part, said inner tubular part located inside said outer tubular part, the inner tubular part forming the at least one feed channel, said ball-shaped closing member being supported at its bottom side by an inwardly projecting annular shoulder having an annular concave cavity for accommodating said closing member in a close fit, said inner tubular part being under spring tension in the direction of the ball-shaped closing member by way of a spring.

6. Injection nozzle according to claim 5, wherein said inwardly projecting annular shoulder is located at an end of the outer tubular part which surrounds said opposite end of said at least one feed channel.

7. Injection nozzle according to claim 1, wherein a heating element is fitted inside said rod for heating the ball-shaped closing member.

* * * * *